(12) United States Patent
Nishiyama et al.

(10) Patent No.: US 8,852,362 B2
(45) Date of Patent: Oct. 7, 2014

(54) AUSTENITIC STAINLESS STEEL PIPE EXCELLENT IN STEAM OXIDATION RESISTANCE AND MANUFACTURING METHOD THEREFOR

(75) Inventors: Yoshitaka Nishiyama, Nishinomiya (JP); Mitsuru Yoshizawa, Amagasaki (JP); Masahiro Seto, Nishinomiya (JP); Katsuki Tanaka, Nishonimiya (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/486,503

(22) Filed: Jun. 1, 2012

(65) Prior Publication Data
US 2012/0279607 A1 Nov. 8, 2012

Related U.S. Application Data

(63) Continuation of application No. PCT/JP2011/061478, filed on May 19, 2011.

(30) Foreign Application Priority Data

Jun. 9, 2010 (JP) ................................. 2010-131613

(51) Int. Cl.

| C22C 38/18 | (2006.01) |
|---|---|
| C21D 11/00 | (2006.01) |
| C22C 38/40 | (2006.01) |
| C21D 7/06 | (2006.01) |
| B21C 37/30 | (2006.01) |
| F28F 21/08 | (2006.01) |
| C22C 38/04 | (2006.01) |
| C21D 9/00 | (2006.01) |
| C22C 38/00 | (2006.01) |
| C22C 38/42 | (2006.01) |
| B21K 21/00 | (2006.01) |
| B21C 37/06 | (2006.01) |
| F16L 9/02 | (2006.01) |
| C22C 38/02 | (2006.01) |
| C21D 6/00 | (2006.01) |
| F22B 37/10 | (2006.01) |
| C22C 38/48 | (2006.01) |
| C21D 8/10 | (2006.01) |
| C21D 9/08 | (2006.01) |
| C22C 38/44 | (2006.01) |

(52) U.S. Cl.
CPC .............. *C21D 6/004* (2013.01); *F28F 21/083* (2013.01); *C22C 38/04* (2013.01); *C21D 9/0068* (2013.01); *C22C 38/001* (2013.01); *C22C 38/42* (2013.01); *B21K 21/00* (2013.01); *C21D 7/06* (2013.01); *B21C 37/06* (2013.01); *F16L 9/02* (2013.01); *C22C 38/02* (2013.01); *F22B 37/10* (2013.01); *C21D 2211/001* (2013.01); *C22C 38/48* (2013.01); *C21D 8/105* (2013.01); *C21D 9/08* (2013.01); *C22C 38/44* (2013.01); *Y10S 148/909* (2013.01)
USPC ............ 148/327; 148/325; 148/500; 148/909; 420/43; 72/53; 29/90.7

(58) Field of Classification Search
CPC ........... B21C 37/06; F16L 9/02; C21D 6/004; C21D 7/06; C21D 8/105; C21D 9/0068; C21D 9/08; C21D 2211/001; C22C 38/40; F22B 37/10; F28F 21/083
USPC ......... 148/325, 327, 500, 909; 420/43; 72/53; 29/90.7
See application file for complete search history.

(56) References Cited

U.S. PATENT DOCUMENTS

2006/0057414 A1* 3/2006 Matsuo ......................... 428/586

FOREIGN PATENT DOCUMENTS

| CN | 1912150 | | 2/2007 |
|---|---|---|---|
| CN | 101265513 | A * | 9/2008 |
| CN | 101395283 | | 3/2009 |
| CN | 100473730 | | 4/2009 |
| EP | 1 637 785 | | 3/2006 |
| JP | 49-135822 | | 12/1974 |
| JP | 52-008930 | | 1/1977 |
| JP | 53-114722 | | 10/1978 |
| JP | 54-138814 | | 10/1979 |
| JP | 55-058329 | | 5/1980 |
| JP | 58-039733 | | 3/1983 |
| JP | 63-054598 | | 3/1983 |

(Continued)

OTHER PUBLICATIONS

Ma Y et al., English machine translation of CN 101265513A, Sep. 2008, p. 1-7.*

(Continued)

*Primary Examiner* — Roy King
*Assistant Examiner* — Caitlin Kiechle
(74) *Attorney, Agent, or Firm* — Clark & Brody

(57) ABSTRACT

There is provided an austenitic stainless steel pipe excellent in steam oxidation resistance. The austenitic stainless steel pipe excellent in steam oxidation resistance contains, by mass percent, 14 to 28% of Cr and 6 to 30% of Ni, and is configured so that a region satisfying the following Formula exists in a metal structure at a depth of 5 to 20 μm from the inner surface of the steel pipe:

$(\alpha/\beta) \times \delta/\epsilon \times 100 \geq 0.3$ where the meanings of symbols in the above Formula are as follows:
α: sum total of the number of pixels of digital image in region in which orientation difference of adjacent crystals detected by electron backscattering pattern is 5 to 50 degrees
β: the number of total pixels of digital image in region of measurement using electron backscattering pattern
ε: analysis pitch width of electron backscattering pattern (μm)
δ: grain boundary width (μm).

4 Claims, No Drawings

(56) References Cited

FOREIGN PATENT DOCUMENTS

| | | |
|---|---|---|
| JP | 58-133352 | 8/1983 |
| JP | 06-322489 | 11/1994 |
| JP | 2002-285236 | 10/2002 |
| JP | 2003-055785 | 2/2003 |
| JP | 2004-132437 | 4/2004 |
| JP | 2006-307313 | 11/2006 |
| JP | 2009-068079 | 4/2009 |
| RU | 2106426 | 3/1998 |
| RU | 2153421 | 7/2000 |
| WO | 2007/099949 | 9/2007 |
| WO | 2008/023410 | 2/2008 |

OTHER PUBLICATIONS

Kostilnik, T., "Shot Peening-Control of Process Variables", ASM Handbook, 1994, ASM International, vol. 5, p. 1.*

H. Exner et al., "Einführung in die Quantitative Gefügeanalyse", Jan. 1, 1986, ISBN: 3-88355-102-2 (mentioned in attached foreign office action).

F.J. Humphreys, "Review grain . . . backscatter diffraction", Journal of Materials Science, vol. 36, No. 16, Jan. 1, 2001, pp. 3833-3854, XP55096806.

* cited by examiner

AUSTENITIC STAINLESS STEEL PIPE EXCELLENT IN STEAM OXIDATION RESISTANCE AND MANUFACTURING METHOD THEREFOR

The disclosure of International Application No. PCT/JP2011/061478 filed 15 Dec. 2011 including specification, drawings and claims is incorporated herein by reference in its entirety.

TECHNICAL FIELD

The present invention relates to a steel pipe having steam oxidation resistance and a manufacturing method therefor. More particularly, the invention relates to an austenitic stainless steel pipe excellent in steam oxidation resistance, which is suitable as a starting material used for boilers, pipes, various heat exchangers, and the like for power-generating equipment, and a manufacturing method for the same.

BACKGROUND ART

In recent years, in various technical fields, global environment problems including global warming have become a matter of increasing concern. Under such a situation, in power-generating plants, it is urgent to suppress the total emissions of carbon dioxide gas, and in a plant to be built newly, the equipment is strongly required to be capable of producing electric power with high efficiency. For example, in thermal power generation boilers, the temperature and pressure of steam is made high as effective measures for producing electric power with high efficiency. This high-temperature and high-pressure steam causes a rise in tube wall temperature of superheater tubes and reheater tubes for boilers, and a steel pipe for boilers that is used therefor is required to have high-temperature strength and resistance to high-temperature oxidation caused by steam. Concerning a method of preventing steam oxidation of steel pipe, various proposals have been made so far as described below.

(A) Technique in which Solution Heat Treatment is Performed after Worked Layer has Been Formed Patent Document 1 discloses an invention in which after an austenitic stainless steel pipe has been subjected to solution treatment, the pipe surface is subjected to cold working such as shot working, grinding, or polishing, and then the steel pipe is subjected to predetermined re-solution treatment. Patent Document 2 discloses an invention in which an austenitic stainless steel pipe is cold worked at a working ratio of 20% or higher, and then is subjected to solid solution heat treatment at a temperature rise rate of 2.9° C./sec or lower.

Patent Document 3 discloses an invention in which on the inner surface of an austenitic iron alloy pipe, a fine grain layer having a thickness of 30 μm or larger is formed by using grains finer than No. 7 grain size number, and thereafter the iron alloy pipe is cold worked at a working ratio of 20% or higher, and then is subjected to recrystallization treatment. Patent Document 4 discloses an invention in which an austenitic stainless steel pipe is cold worked so that the hardness at a position 20 μm distant from the inner surface thereof is Hv320 or higher, and is subjected to solution treatment.

(B) Technique in which a Fine Grain Structure is Kept Even after Solution Heat Treatment by Increasing the Contents of C and N Patent Document 5 discloses an invention relating to an austenitic stainless steel pipe that has a fine grain structure of the grain size number of No. 7 or higher on the inner surface thereof, and contains 0.15% or higher of (C+N) in the fine grain layer.

(C) Technique for Forming Cold Worked Layer by Peening

Patent Document 6 discloses an invention in which after an austenitic stainless steel pipe has been finally heat treated, the steel pipe is subjected to peening by blasting particles onto the inner surface of the steel pipe. Patent Document 7 discloses an invention in which an austenitic stainless steel pipe is peened under predetermined conditions to form a worked layer having a thickness of 10 μm or larger. Patent Document 8 discloses an invention in which a tube body taken out of an existing boiler is subjected to chemical cleaning to remove scale from the inner surface thereof after being heat treated, and thereafter the inner surface of the tube body is subjected to shotblasting to form a cold worked layer.

(D) Technique for Improving Adhesiveness of Scale

Patent Document 9 discloses an invention relating to a steel pipe for boilers excellent in steam oxidation resistance, which is produced by subjecting an austenitic stainless steel pipe containing a rare earth metal to solution treatment, and is provided with a peened layer by blasting particles onto the inner surface of the steel pipe. Patent Document 10 discloses an invention relating to a steel pipe in which 9 to 28 mass % of Cr is contained, the maximum height of the inner surface after cold working is 15 μm or larger, and further the difference in Vickers hardness between the inner surface layer and the central portion of wall thickness of pipe is 100 or more.

(E) Technique for Subjecting Steel Pipe to Cold Working of High Working Ratio

Patent Document 11 discloses an invention in which the inner surface of a heat-resistant ferritic steel pipe or a heat-resistant austenitic steel pipe containing 5 to 30 mass % of Cr is subjected to ultrasonic impact treatment. Patent Document 12 discloses an invention relating to an austenitic stainless steel pipe for boilers which contains 16 to 20 wt % of Cr and the inner surface of which is cold worked, wherein the Cr concentration at a position in the vicinity of the inner surface of steel pipe is 14 wt % or higher, and the hardness at a position 100 μm distant from the inner surface of steel pipe is 1.5 times or more the average hardness of the base metal or Hv300 or higher. Patent Document 13 discloses an invention relating to a steel pipe excellent in steam oxidation resistance, which contains 8 to 28 mass % of Cr and has a hard worked layer.

(F) Technique for Improving Steam Oxidation Resistance of Heat-Resistant Ferritic Steel Patent Document 14 discloses an invention relating to a method for working a heat-resistant ferritic steel in which a steel containing 9.5 to 15% of Cr is normalized and tempered to uniformize the crystal grains and steel micro-structure, and thereafter a shot worked layer is formed by blasting particles onto the surface of steel.

LIST OF PRIOR ART DOCUMENT(S)

Patent Documents

[Patent Document 1] JP53-114722A
[Patent Document 2] JP54-138814A
[Patent Document 3] JP55-58329A
[Patent Document 4] JP58-39733A
[Patent Document 5] JP58-133352A
[Patent Document 6] JP49-135822A
[Patent Document 7] JP52-8930A
[Patent Document 8] JP63-54598A
[Patent Document 9] JP6-322489A

[Patent Document 10] JP2006-307313A
[Patent Document 11] JP2004-132437A
[Patent Document 12] WO2008/023410
[Patent Document 13] JP2009-68079A
[Patent Document 14] JP2002-285236A

DISCLOSURE OF THE INVENTION

Problems to be Solved by the Invention

The techniques described in item (A) are techniques in which solution heat treatment is performed at high temperatures to prevent a decrease in creep rupture strength and stress corrosion cracking. Unfortunately, if the solution heat treatment is performed, the strain introduced into crystal grains by working is removed, and recrystallization occurs. Depending on the chemical composition of steel pipe, the crystal grains grown by the solution treatment increase in size excessively, and therefore it is difficult to maintain the fine grain layer of steel surface stably. As a result, the steam oxidation resistance improved by cold working treatment is sometimes decreased.

In the technique described in item (B), although the resistance to steam oxidation of the pipe can somewhat be improved, the surface layer in the pipe becomes extremely sensitive during the use of boiler, so that there is a danger that stress corrosion cracking occurs at the boiler stopping (operation stopping) time.

Thus, any of the techniques described in items (A) and (B) has many problems when being used practically.

The techniques described in item (C) are effective techniques used as preventive measures against steam oxidation in a currently used boiler for commercial purposes, that is, a boiler having a steam temperature of 566° C. (1050° F.), and are applied to some steel pipes for boilers made of an austenitic stainless steel. However, for the steam temperature of a high-efficiency boiler adopted in a new plant of, for example, 621° C. (1150° F.), the tube wall temperature of the superheater tube and reheater tube is 50 to 100° C. higher than that of the currently used boiler. A boiler having operating conditions of higher steam temperature such as 650° C. or 700° C. has been studied. In such a high temperature region, it is difficult to maintain, for a long period of time, the steam oxidation restraining effect achieved by the techniques described in item (C).

The techniques described in item (D) have an effect of maintaining the protectability of scale long; however, considering the time period for which the steel pipe is used, it cannot be said that this effect is sufficient. Also, in the techniques described in item (E), the steel pipe can be subjected to cold working of a high working ratio. However, although these techniques are effective in forming scale initially, a problem remains in maintaining the protectability for a long period of time. Also, the ultrasonic impact treatment has problems of apparatus introduction and operating cost.

In the technique described in item (F), a protection film having high adhesiveness can be formed on a heat-resistant ferritic steel on which a Cr oxide film is difficult to form, so that some improvement in steam oxidation resistance accomplished by the protection film can be anticipated. However, this technique does not provide an essential solution considering long-teem use. Also, this technique does not relate to a heat-resistant austenitic steel.

The present invention has been made to solve the problems with the prior arts, and accordingly an objective thereof is to provide a steel pipe having remarkably excellent steam oxidation resistance.

Means for Solving the Problems

The present inventors conducted studies earnestly to explore the essential problem about the steam oxidation resistance in an austenitic stainless steel pipe, and resultantly came to obtain the following findings.

(a) When the surface of a material not subjected to working after solution heat treatment, that is, an as-solution heated material is brought into contact with high-temperature steam, thick steam oxidation scale, which is called two-layer scale, is produced on the surface of the material. In contrast, when the material subjected to working after solution heat treatment is brought into contact with high-temperature steam, it is generally said that extremely thin Cr oxidation scale in which the growth rate of $Cr_2O_3$ and the like is slow is produced on the steel surface.

(b) However, it was revealed in the observation of the oxidation scale after the steam oxidation test for various worked steel pipes that even for a steel pipe which had been subjected to working after solution heat treatment, desired Cr oxidation scale could not sometimes be produced uniformly on the surface of steel pipe. In the portion in which the Cr oxidation scale is not produced, abnormal oxidation occurs with this portion being a starting point in long-term use, which deteriorates the steam oxidation resistance remarkably.

(c) For various steel pipes, the micro-structure in the vicinity of the outer layer of the inner surface thereof was analyzed detailedly, and as a result, it was revealed that only in the steel pipe having a fine metal structure involving small-angle grain boundaries or large-angle grain boundaries (hereinafter, referred to collectively as "subgrains") in the vicinity of the outer layer, the Cr oxidation scale is produced uniformly. Although the principle that the subgrain promotes the production of Cr oxidation scale is indefinite, it is thought that the production of Cr oxidation scale depends on the difference in the flux of Cr going from the interior toward the surface of metal, in other words, depends on the difference in the diffusion of Cr. In this description, the small-angle grain boundary is a structure formed by the rearrangement of dislocation, and refers to a structure in which the adjacent crystals have an orientation difference smaller than 5 to 15 degrees. Also, a structure especially having an orientation difference of 15 degrees or larger is referred to as the large-angle grain boundary. The orientation difference can be determined by measuring an electron backscattering pattern called, for example, EBSD (Electron BackScatter Diffraction) or EBSP (Electron BackScattering Pattern).

(d) It was revealed that, for the diffusion of Cr, the dislocation diffusion is faster than that of the diffusion in crystal grain (volumetric diffusion), and further the grain boundary diffusion turns to a high-speed diffusion path. Therefore, the decrease in grain size of metal structure increases the flux of Cr going to the surface, and resultantly Cr oxidation scale can be produced uniformly. However, at the crystal grain boundaries, grain boundary sliding occurs at high temperatures, so that the creep characteristics degrade. Therefore, generally, in order to enhance the creep characteristics of a high-temperature material, a coarse grain structure is aimed, and it is difficult to produce Cr oxidation scale uniformly.

(e) On the other hand, the diffusion of Cr through dislocation also increases the flux of Cr going to the surface. When dislocation is introduced, the dislocation tends to take an arrangement such as to lower the elastic energy. Therefore, excessive working divides the metal into a portion in which the dislocation density is high and a portion in which the dislocation density is low (cellularization of dislocation).

However, in such a state, dislocation merely accumulates, so that the flux of Cr going to the surface through dislocation is insufficient. When the introduction and recovery of this dislocation are repeated, the subgrains are rearranged. Since the subgrain has a structure in which the adjacent atoms have an orientation difference, the effect of grain boundary diffusion is achieved, and Cr becomes likely to diffuse.

Based on the principle, a steel pipe the inner surface of which is subjected to controlled hard working and which has a fine metal structure involving subgrains can be reformed into a steel pipe in which Cr oxidation scale is produced uniformly and the steam oxidation resistance is excellent. Further, the present inventors also paid attention to the stable maintenance of oxidation scale after the use at higher temperatures. In order to maintain the Cr oxidation scale formed at the initial stage of steam oxidation, the flux of Cr must be continuous. On the other hand, the supply of Cr from the metal structure having subgrains decreases with the elapse of time. Therefore, after some period of time has elapsed, the supply of Cr from not only the metal structure having subgrains but also the metal structure having not been subjected to controlled hard working, that is, the metal structure that the steel pipe has before working becomes necessary. This supply of Cr from the metal structure is greatly important especially when the steel pipe is used at a high temperature close to 700° C. Accordingly, the present inventors further advanced the studies earnestly from the viewpoint of the stable maintenance of Cr oxidation scale.

(f) The Cr flux from the metal structure may be less than the Cr flux necessary for forming Cr oxidation scale uniformly at the initial stage. However, if the grain size of metal structure having not been subjected to controlled hard working is large, the Cr flux becomes insufficient, so that it is difficult to stably maintain the Cr oxidation scale. As the result, oxidation scale that contains Fe and is poor in protectability is produced, and therefore abnormal oxidation occurs. As the result of the steam oxidation test conducted for a long period of time, it was revealed that if the grain size of metal structure having not been subjected to controlled hard working is not larger than 50 μm, the Cr oxidation scale can be maintained stably.

(g) That is, in the case where the steel pipe is used in high-temperature environments in which the temperature especially reaches a temperature close to 700° C., the grain size of metal structure having not been subjected to controlled hard working must be limited to 50 μm or smaller to maintain the steam oxidation resistance of steel pipe for a long period of time.

The present invention has been made based on the findings, and the gist thereof is the austenitic stainless steel pipes excellent in steam oxidation resistance and manufacturing methods therefor described in the following items (i) to (iv).

(i) An austenitic stainless steel pipe excellent in steam oxidation resistance that contains, by mass percent, 14 to 28% of Cr and 6 to 30% of Ni, wherein a region satisfying Formula (1) exists in a metal structure at a depth of 5 to 20 μm from the inner surface of steel pipe:

$$g \geq 0.3 \quad (1)$$

where g in Formula (1) is a value calculated from Formula (2), $$g = (\alpha/\beta) \times \delta/\epsilon \times 100 \quad (2)$$

where the meanings of symbols in Formula (2) are as follows:
g: volume ratio (%)
α: sum total of the number of pixels of digital image in region in which orientation difference of adjacent crystals detected by electron backscattering pattern is 5 to 50 degrees
β: the number of total pixels of digital image in region of measurement using electron backscattering pattern
ε: analysis pitch width of electron backscattering pattern (μm)
δ: grain boundary width (μm).

(ii) The austenitic stainless steel pipe excellent in steam oxidation resistance described in item (i), wherein a crystal grain size of the steel pipe is 50 μm or smaller.

(iii) A manufacturing method for an austenitic stainless steel pipe excellent in steam oxidation resistance containing, by mass percent, 14 to 28% of Cr and 6 to 30% of Ni, wherein a region satisfying Formula (1) is formed in a metal structure at a depth of 5 to 20 μm from the inner surface of steel pipe, the method being carried out by blasting particles onto the inner surface of the austenitic stainless steel pipe:

$$g \geq 0.3 \quad (1)$$

where g in Formula (1) is a value calculated from Formula (2), $$g = (\alpha/\beta) \times \delta/\epsilon \times 100 \quad (2)$$

where the meanings of symbols in Formula (2) are as follows:
g: volume ratio (%)
α: sum total of the number of pixels of digital image in region in which orientation difference of adjacent crystals detected by electron backscattering pattern is 5 to 50 degrees
β: the number of total pixels of digital image in region of measurement using electron backscattering pattern
ε: analysis pitch width of electron backscattering pattern (μm)
δ: grain boundary width (μm).

(iv) The manufacturing method for an austenitic stainless steel pipe excellent in steam oxidation resistance described in item (iii), wherein the method is carried out by blasting particles having an average particle size of 0.5 mm or smaller.

Advantageous Effect(s) of the Invention

According to the present invention, scale excellent in protectability can be formed uniformly on the surface of the steel pipe at the initial stage of use, and the steam oxidation resistance can be improved significantly. Also, even in the case where the steel pipe is used at a high temperature reaching a temperature close to 700° C., the protective scale is maintained stably, and thereby abnormal oxidation can be inhibited from occurring.

MODE FOR CARRYING OUT THE INVENTION

In order to obtain a steel pipe in which scale excellent in protectability is formed uniformly on the inner surface of pipe at the initial stage of use, a metal structure consisting of subgrains must be formed on the inner surface of steel pipe depending on the controlled hard working conditions. Since the subgrain is formed in the crystal grain before working, the grain size of subgrain is smaller than the size of crystal grain of the steel pipe itself. The flux of Cr increases with the increase in the diffusion path, so that the metal structure having subgrains must be formed. The volume ratio of a subgrain, that is, a small-angle grain boundary having an orientation difference smaller than 5 to 15 degrees and a large-angle grain boundary having an orientation difference of 15 degrees or larger can be determined by EBSD. In the present invention, the volume ratio of a region in which the orientation difference of the adjacent crystals is 5 to 50 degrees is 0.3 or higher, that is, is caused to satisfy Formula (1). The volume ratio of a region in which the orientation difference of the adjacent crystals is 5 to 50 degrees is expressed as g (%) calculated from Formula (2):

$$g \geq 0.3 \quad (1)$$

where g in Formula (1) is a value calculated from Formula (2), $$g=(\alpha/\beta)\times\delta/\epsilon\times 100 \quad (2)$$

where the meanings of symbols in Formula (2) are as follows:
g: volume ratio (%)
$\alpha$: sum total of the number of pixels of digital image in region in which orientation difference of adjacent crystals detected by EBSD is 5 to 50 degrees
$\beta$: the number of total pixels of digital image in region of measurement using EBSD
$\epsilon$: analysis pitch width of EBSD ($\mu$m)
$\delta$: grain boundary width ($\mu$m).

The value of g is preferably 0.5 or higher, further preferably 1.0 or higher. The term $\alpha/\beta$ in Formula (2) denotes an apparent area fraction. Since it is thought that the grain boundaries exist uniformly, the area fraction is equal to the volume ratio. The width of a detection region of 5 to 50 degrees actually has the analysis pitch widths ($\mu$m) of EBSD, and therefore the width of the detection region is converted into the grain boundary width. The grain boundary width $\delta$ ($\mu$m) is assumed to be $1\times 10^{-3}$. The upper limit value of g is not especially set, but the realizable upper limit value is 30.

In the case where the usage environment of steel pipe has a high temperature exceeding 700° C., the stable maintenance of Cr oxidation scale is of importance. To stably maintain the Cr oxidation scale, the crystal grain size of the base metal must be made in the proper range, and the flux of Cr from the base metal must be secured. Therefore, the crystal grain size of the base metal should be 50 $\mu$m or smaller on the average. The diffusion path passing through the grain boundary increases with the decrease in crystal grain size. Therefore, the crystal grain size of the base metal is preferably 30 $\mu$m or smaller on the average. However, if the crystal grain size of the base metal is excessively small, the creep characteristics of steel pipe degrade as described above. For this reason, the crystal grain size of the base metal is preferably 10 $\mu$m or larger on the average. Since the crystal grain size of the base metal is substantially uniform in the region in which the steel pipe is not subjected to working, measurement has only to be made in the central portion of the wall thickness of steel pipe. The crystal grain size can be measured by using an optical microscope or the like.

If the degree of controlled hard working is high, the subgrain further causes crystal rotation, and a metal structure having fine grain boundaries is formed. The grain boundaries in such a fine crystal achieve an effect as a diffusion path, so that such a metal structure may be formed in a portion close to the outer layer of the inner surface of steel pipe.

The metal structure of subgrain may be formed at a depth of 5 $\mu$m or larger from the inner surface of steel pipe. However, because the long-term steam oxidation resistance can be secured more stably at high temperatures, the metal structure of subgrain is preferably formed to a depth of 10 $\mu$m or larger. As described above, if this subgrain is very fine, it is sometimes difficult to measure the orientation difference by using EBSD. However, under the fine crystal structure (at a depth position away from the inner surface), a subgrain measurable by EBSD, in which the degree of working is lower than the hard working, always exists. Therefore, not only the structure at a depth of 5 $\mu$m but also the structure in a layer thereunder is measured by EBSD to determine the presence of subgrain.

In the specific measuring method and determining method in the present invention, an observation is made using EBSD (magnification: ×20,000) in regions of a plurality of locations in the depth range of 5 to 20 $\mu$m from the inner surface (in this embodiment, three locations of 5 $\mu$m, 10 $\mu$m, and 15 $\mu$m), and the grain boundary having an orientation difference of 5 to 50 degrees is measured, whereby the volume ratio g is derived from Formula (2). When g at at least one location of the plurality of locations is 0.3 or higher, it is defined that the steel pipe has the subgrain structure specified in the present invention.

The pipe that is the subject of the present invention is a heat-resistant austenitic steel pipe and the like. The scale produced on the inner surface of pipe must consist mainly of Cr oxides. Therefore, an austenitic stainless steel containing 14 to 28 mass % of Cr and 6 to 30 mass % of Ni is used for the material for the pipe.

As the material for the pipe that is subject of the present invention, austenitic stainless steels such as SUS304, SUS309, SUS310, SUS316, SUS321, and SUS347 specified in JIS Standard, and steels equivalent to these stainless steels can be cited. The chemical composition of the applicable steel type is as described below. In the description below, an ideogram of "%" relating to the content of component means "mass percent".

The material for the austenitic stainless steel pipe is an austenitic stainless steel consisting of C: 0.2% or less, Si: 2.0% or less, Mn: 0.1 to 3.0%, Cr: 14 to 28%, and Ni: 6 to 30%, the balance being Fe and impurities. This steel may contain, as necessary, one or more kinds selected from Mo: 5% or less, W: 10% or less, Cu: 5% or less, N: 0.3% or less, V: 1.0% or less, Nb: 1.5% or less, Ti: 0.5% or less, Ca: 0.02% or less, Mg: 0.02% or less, Al: 0.3% or less, Zr: 0.5% or less, B: 0.02% or less, and rare earth metals: 0.1% or less.

The "impurities" are elements that mixedly enter by means of various factors in the production process, including raw materials such as ore and scrap, when the stainless steel is manufactured on an industrial scale.

Hereunder, the operational advantages of the components of the above-described steel type and the reasons why the contents thereof are restricted are explained.

C: 0.2% or Less

Carbon (C) is an element effective in securing strength and creep strength. However, if the C content exceeds 0.2%, undissolved carbides remain in the solution treatment state, and C sometimes does not contribute to the improvement in high-temperature strength. Also, C may exert an adverse influence on mechanical properties such as toughness. Therefore, the C content is preferably 0.2% or less. From the viewpoint of deterioration in hot workability and toughness, the C content is further preferably 0.12% or less. In order to achieve the above-described effect, 0.01% or more of C is preferably contained.

Si: 2.0% or Less

Silicon (Si) is an element used as a deoxidizer, and moreover is an element effective in improving the steam oxidation resistance. However, if the Si content increases, the weldability or hot workability is deteriorated. Therefore, the Si content is preferably 2.0% or less, and is further preferably 0.8% or less. The above-described effect becomes remarkable if 0.1% or more of Si is contained.

Mn: 0.1 to 3.0%

Manganese (Mn) is effective as a deoxidizer like Si. Also, Mn has an action for restraining the deterioration in hot workability caused by S contained as an impurity. To achieve the deoxidizing effect and to improve the hot workability, 0.1% or more of Mn is preferably contained. However, if Mn is contained excessively, embrittlement occurs. Therefore, the upper limit of the Mn content is preferably 3.0%, further preferably 2.0%.

Cr: 14 to 28%

Chromium (Cr) is an element effective in contributing to high-temperature strength, and improving oxidation resistance and corrosion resistance by producing scale consisting mainly of Cr oxides on the inner surface of steel pipe. To achieve these effects, 14% or more of Cr must be contained. However, if Cr is contained excessively, the toughness and hot workability may be deteriorated. Therefore, the upper limit of the Cr content is 28%. The preferable lower limit of the Cr content is 15%, and the preferable upper limit thereof is 26%. In the case where the acid resistance is improved, the lower limit of the Cr content is further preferably 16%.

Ni: 6 to 30%

Nickel (Ni) is an element necessary for stabilizing the austenitic structure and improving the creep strength. To achieve these effects, 6% or more of Ni must be contained. However, even if much Ni is added, the effect saturates, and merely the cost is increased, so that the upper limit of the Ni content is 30%. The lower limit of the Ni content is preferably 7%. The upper limit thereof is preferably 25%, further preferably 21%.

Mo: 5% or less
W: 10% or less
Cu: 5% or less

Molybdenum (Mo), tungsten (W), and copper (Cu) may be contained because they enhance the high-temperature strength of steel. However, if these elements are contained in large amounts, the weldability and workability are impaired. Therefore, if these elements are contained, the upper limits of the Mo content and Cu content each are 5%, and the upper limit of the W content is 10%. The above-described effect becomes remarkable when 0.1% or more of at least any one kind of these elements is contained.

N: 0.3% or Less

Nitrogen (N) contributes to solid-solution strengthening of steel, and also combines with other elements to achieve an effect of strengthening steel by means of precipitation strengthening action. However, if N is contained excessively, the ductility and weldability are sometimes deteriorated. Therefore, if N is contained, the content thereof is 0.3% or less. In the case where it is desirable to achieve the above-described effect, 0.005% or more of N should be contained.

V: 1.0% or less
Nb: 1.5% or less
Ti: 0.5% or less

Vanadium (V), niobium (Nb), and titanium (Ti) are elements that combine with carbon and nitrogen to form carbonitrides, thereby contributing to precipitation strengthening. Therefore, these elements can be added as necessary. However, if these elements are contained excessively, the workability of steel may be impaired. Therefore, it is preferable that the V content be 1.0% or less, the Nb content be 1.5% or less, and the Ti content be 0.5% or less. In the case where it is desirable to achieve the above-described effect, 0.01% or more of one or more kinds selected from these elements is preferably contained.

Ca: 0.02% or less
Mg: 0.02% or less
Al: 0.3% or less
Zr: 0.5% or less
B: 0.02% or less
Rare earth metals: 0.1% or less Calcium (Ca), magnesium (Mg), aluminum (Al), Zirconium (Zr), Boron (B), and rare earth metals (La, Ce, Y, Pr, Nd, etc.) have an effect of improving the strength, workability, and steam oxidation resistance. Therefore, these elements can be added as necessary. However, if the total content of these elements exceeds 0.8%, the workability or weldability may be impaired. The rare earth metals mean fifteen elements of lanthanoid plus Y and Sc, that is, seventeen elements. In the case where it is desirable to achieve the above-described effect, 0.0001% or more of one or more kinds selected from these elements is preferably contained.

The manufacturing method for the steel pipe in accordance with the present invention is not subject to any special restriction, and the ordinary melting process, casting process, pipe-making process can be adopted. For example, after a steel having the above-described chemical composition has been melted and cast, a material pipe is produced by any of various hot rolling processes (extrusion pipe-making process, punching pipe-making process, Mannesmann pipe-making process, etc.), and this material pipe is subjected to softening heat treatment as necessary. After a hot material pipe has been formed into a pipe having a desired shape by any of various cold working processes such as cold rolling and cold drawing, a worked layer is formed on the inner surface of steel pipe. Also, the process may be such that after the pipe has been formed by cold working, the pipe is subjected to solution heat treatment to homogenize the crystal grains, and thereafter a metal structure having subgrains is formed on the inner surface of steel pipe.

The method for forming subgrains on the inner surface of steel pipe is not subject to any special restriction if the method is one in which the inner surface of steel pipe is subjected to controlled strike or impact. For example, a method can be used in which strike or impact energy is controlled by using any of various methods such as publicly known shotpeening and shotblasting, shot working, sandblasting, sand working, airblasting, water jet, ultrasonic waves, polishing, ball milling, grinding, and honing. Also, the material quality, shape, and the like of particles used for the strike are not subject to any special restriction. As the material quality, for example, steel, cast steel, stainless steel, glass, quartz sand, alumina, amorphous alloy, or zirconia can be used. As the shape, for example, a spherical shape, cut wire shape, round cut wire shape, or grid shape can be used. The particles may be blasted by using compressed air, centrifugal force created by an impeller, high-pressure water, or ultrasonic waves. Also, the particles may be blasted by compressed air or the like after being mixed with a liquid (liquid honing). In the case where the particles are not used, metal-made members may be blasted directly by using ultrasonic waves or the like, or impact can be applied by bringing a tool into direct contact with the steel pipe such as in the case of polishing, grinding, and honing. In particular, in the case where it is required that steam oxidation resistance be secured stably at high temperatures for a long period of time, the particles are preferably blasted so that a metal structure having subgrains can be formed down to a region deep from the inner surface of steel pipe.

In the case of shot working, shot working has only to be performed by appropriately selecting shot conditions such that hard working is applied to the inner surface as compared with the conventional method. The shot conditions are not subject to any special restriction; however, for example, the injection amount of shot particles is preferably 1 kg/cm$^2$/min or larger. Also, with the decrease in size of shot particles, heavier working can be applied to a region close to the inner surface. In particular, if particles having an average particle size of 0.5 mm or smaller are controlledly blasted, a metal structure having subgrains can be formed uniformly over the overall length in the longitudinal direction of the inner surface of steel pipe.

By these methods, the metal structure satisfying the above-described conditions has only to be formed on the inner surface of steel pipe by controlling various conditions.

EXAMPLE(S)

Steel pipes each having the chemical composition given in Table 1 were manufactured under various conditions, and the crystal grain size of the steel pipe itself and the presence of a metal structure having subgrains at a depth position from the inner surface of steel pipe were measured according to the method described below. Further, a steam oxidation test was conducted.

TABLE 1

| Steel No. | Chemical composition (mass %, balance being Fe and impurities) | | | | | | |
|---|---|---|---|---|---|---|---|
|  | C | Si | Mn | Cr | Ni | Nb | Others |
| 1 | 0.09 | 0.4 | 1.5 | 18.3 | 11.4 | 0.9 | — |
| 2 | 0.08 | 0.2 | 0.8 | 18.6 | 9.0 | 0.5 | Cu: 2.9, N: 0.10 |
| 3 | 0.07 | 0.4 | 1.2 | 25.0 | 20.0 | 0.5 | N: 0.24 |
| 4 | 0.07 | 0.3 | 1.2 | 13.6* | 9.5 | 0.7 | Mo: 0.1 |

*Means deviation from range specified by invention according to claim 1.

For steel Nos. 1 to 4, an ingot of 180 KG was prepared by vacuum melting at a laboratory. After a material pipe (outside diameter: 110 mm, wall thickness: 12 mm) had been produced by hot forging and hot extrusion, for steel Nos. 2, 3 and 4, a steel pipe (outside diameter: 50.8 mm, wall thickness: 8 mm) was produced by cold rolling. Thereafter, solution heat treatment was performed. For steel No. 1, surface scale was removed after hot extrusion, and then solution heat treatment was performed. For steel No. 2, steel pipes having four kinds of crystal grain sizes were produced by controlling the temperature and time period of solution heat treatment. The inner surfaces of these steel pipes were subjected to surface treatment under the conditions given in Table 2 to prepare specimens. In the case of shot working, the working depth was controlled by changing the injection pressure, injection amount, and the like. Also, in hot shotpeening, the steel pipe heated to 350° C. was subjected to shot working immediately after being taken out of a furnace.

TABLE 2

| Test No. | Steel No. | Solution treatment conditions (temperature × time period) | Surface treatment method | Shot working conditions (injection pressure, injection amount) | Particle size of surface treatment (mm) | Average crystal grain size of base metal[#1] (μm) |
|---|---|---|---|---|---|---|
| 1 | 1 | 1220° C. × 10 min | Ultrasonic shotpeening | — | 1.0 | 27.5 |
| 2 | 1 | 1220° C. × 10 min | Shotpeening | 5 kg/cm², 1.0 kg/cm²/min | 0.6 | 27.5 |
| 3 | 2 | 1160° C. × 10 min | Shotpeening | 4 kg/cm², 3.1 kg/cm²/min | 0.6 | 17.3 |
| 4 | 2 | 1160° C. × 10 min | Shotpeening | 5 kg/cm², 6.4 kg/cm²/min | 0.3 | 17.3 |
| 5 | 2 | 1160° C. × 10 min | Shotpeening | 4 kg/cm², 0.7 kg/cm²/min | 0.3 | 17.3 |
| 6 | 2 | 1160° C. × 10 min | Shotpeening | 4 kg/cm², 0.2 kg/cm²/min | 0.3 | 17.3 |
| 7 | 2 | 1160° C. × 10 min | Hot shotpeening | 5 kg/cm², 6.4 kg/cm²/min | 0.3 | 17.3 |
| 8 | 2 | 1250° C. × 10 min | Shotpeening | 5 kg/cm², 6.4 kg/cm²/min | 0.3 | 44.0 |
| 9 | 2 | 1240° C. × 20 min | Shotpeening | 5 kg/cm², 6.4 kg/cm²/min | 0.3 | 54.2** |
| 10 | 2 | 1250° C. × 30 min | Shotpeening | 5 kg/cm², 6.4 kg/cm²/min | 0.3 | 94.1** |
| 11 | 2 | 1160° C. × 10 min | Sandblasting | 4 kg/cm², 3.0 kg/cm²/min | 0.1 | 17.3 |
| 12 | 2 | 1160° C. × 10 min | Polishing | — | — | 17.3 |
| 13 | 3 | 1220° C. × 20 min | Shotpeening | 6 kg/cm², 11.3 kg/cm²/min | 0.3 | 25.6 |
| 14 | 4* | 1160° C. × 10 min | Shotpeening | 5 kg/cm², 6.4 kg/cm²/min | 0.3 | 21.2 |
| 15 | 4* | 1160° C. × 10 min | Shotpeening | 5 kg/cm², 2.0 kg/cm²/min | 0.3 | 21.2 |

| Test No. | Volume ratio of metal structure having subgrains[#2] (%) | | | 650° C. abnormal oxidation covering ratio[#3] (%) | 750° C. abnormal oxidation covering ratio[#3] (%) |
|---|---|---|---|---|---|
|  | 5 μm depth | 10 μm depth | 15 μm depth | | |
| 1 | 0.85 | 0.55 | 0.46 | 3.9 | 6.8 |
| 2 | 0.33 | 0.13* | <0.01* | 4.6 | 9.5 |
| 3 | 1.57 | 1.21 | 0.89 | 2.4 | 3.2 |
| 4 | 2.15 | 1.67 | 1.42 | 0.5 | 0.8 |
| 5 | 0.25* | 0.09* | 0.04* | 16.4 | 68.3 |
| 6 | 0.10* | 0.03* | <0.01* | 42.1 | 100 |
| 7 | 1.89 | 0.85 | 0.15* | 1.2 | 2.6 |
| 8 | 1.75 | 1.41 | 1.24 | 2.1 | 4.1 |
| 9 | 1.92 | 1.65 | 1.19 | 2.5 | 8.7 |
| 10 | 1.47 | 0.84 | 0.43 | 2.8 | 9.4 |
| 11 | 0.49 | 0.32 | 0.19* | 5.4 | 8.2 |
| 12 | Unmeasurable | Unmeasurable | 3.10 | 1.6 | 1.9 |
| 13 | Unmeasurable | 2.14 | 1.88 | 1.2 | 1.6 |
| 14 | 1.34 | 0.79 | 0.52 | 100 | 100 |
| 15 | 0.64 | 0.32 | 0.17* | 100 | 100 |

*Means deviation from range specified by invention according to claim 1.
**Means deviation from range specified by invention according to claim 2.
[#1]Indicates crystal grain size of steel pipe itself.
[#2]Indicates volume ratio of metal structure of subgrain etc. (small-angle grain boundary or further large-angle grain boundary) having orientation difference of 5 to 50 degrees.
[#3]Indicates result of steam oxidation test at each temperature for 500 hours.

[Crystal Grain Size of Steel Pipe]

A small-piece test specimen was cut out of each specimen, a central portion of the wall thickness of steel pipe of the surface corresponding to the cross section of steel pipe of each specimen was observed at four visual fields under an optical microscope, and the crystal grain size of the steel pipe itself (base metal) was measured. Table 2 gives the mean value thereof.

[Volume Ratio of Subgrain]

A small-piece test specimen was cut out of each specimen, the surface corresponding to the cross section of steel pipe of each specimen was observed at three visual fields by EBSD (magnification: ×20,000) in regions 5 μm, 10 μm, and 15 μm deep from the inner surface, and the grain boundary having an orientation difference of 5 to 50 degrees was measured. Based on the obtained result, the volume ratio g was derived from Formula (2). The analysis pitch width ε at a magnification of ×20,000 is 0.01 μm. Table 2 gives the mean value at each depth position. In the case where g at at least one location of three depth locations was 0.3 or higher, it was defined that the present invention was satisfied. The term "unmeasurable" in the volume ratio column indicates that the subgrain was very fine, and the orientation difference could not be measured by EBSD.

[Steam Oxidation Test]

A rectangular test specimen measuring 2 mm thick×10 mm wide×25 mm long was cut out of each specimen so that the inner surface of pipe was a part of the surface of the test specimen. This test specimen was held in a form of being hung from a jig, was inserted into a horizontal tubular heating furnace, and was subjected to oxidation test at temperatures of 650° C. and 750° C. for 500 hours in the steam atmosphere having a dissolved oxygen amount of 100 ppb. The test specimen taken out after being furnace cooled was embedded in a resin, the cross section thereof being cut and mirror polished, and thereafter the cross section of oxide scale produced on the inner surface of steel pipe was observed under an optical microscope over the overall length of 8 mm excluding 1 mm at both ends from the test specimen width of 10 mm. A location at which the scale thickness exceeds 10 μm was defined as abnormal oxidation, and the total length of occurrence of abnormal oxidation was determined. The value obtained by dividing this total length by the measurement length of 8 mm was determined as abnormal oxidation covering ratio (%). This value is given in Table 2. Test No. in which the abnormal oxidation covering ratio is 10% or lower was made acceptable.

As can be seen from Table 2, for test Nos. 1 to 4 and 7 to 13, in which the volume ratio g was within the range specified in the present invention, that is, at least one measurement point at which g was 0.3 or higher existed, the abnormal oxidation covering ratio was 10% or lower in both of the steam oxidation tests at 650° C. and 750° C., so that excellent steam oxidation resistance was exhibited. Among these test Nos., for test Nos. 2 and 11, in which g was less than 0.5 at all measurement points, resultantly, the abnormal oxidation covering ratio was relatively high though being within the acceptable range. Also, for test Nos. 9 and 10, in which the crystal grain size of base metal was 50 μm or larger and deviates from the specification of the present invention, a relatively high abnormal oxidation covering ratio was resultantly exhibited. On the other hand, for test Nos. 5 and 6, in which g was less than 0.3 at all depth positions, the abnormal oxidation covering ratio exceeded 10% in both of the steam oxidation tests at 650° C. and 750° C., so that these test Nos. were unacceptable. Also, for test Nos. 14 and 15, in which steel No. 4 in which the Cr content was lower than the specified lower limit was used, the abnormal oxidation covering ratio exceeded 10% in both of the steam oxidation tests at 650° C. and 750° C., so that these test Nos. were unacceptable.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

According to the present invention, scale that is excellent in protectability can be formed uniformly on the surface of a steel pipe at the initial stage of usage, and steam oxidation is less liable to occur under the usage condition at a high temperature exceeding 600° C., especially even under the usage condition at a high temperature close to 700° C. Thus, the austenitic stainless steel pipe of the present invention is excellent in steam oxidation resistance, and therefore is suitable for being used in high-temperature environments such as boilers.

What is claimed is:

1. An austenitic stainless steel pipe having steam oxidation resistance which contains, by mass percent, 14 to 28% of Cr and 6 to 30% of Ni, wherein a region satisfying Formula (1) exists in a metal structure at least in one location of 10 to 15 μm in a depth range from an inner surface of the steel pipe and the region is formed by blasting shots or sands:

$$g \geq 0.3 \tag{1}$$

where g in Formula (1) is a value calculated from Formula (2), $$g = (\alpha/\beta) \times \delta/\epsilon \times 100 \tag{2}$$

where the meanings of symbols in Formula (2) are as follows;

g: volume ratio (%)

α: sum total of the number of pixels of digital image in region in which orientation difference of adjacent crystals detected by electron backscattering pattern is 5 to 50 degrees β: the number of total pixels of digital image in region of measurement using electron backscattering pattern ε: analysis pitch width of electron backscattering pattern (μm)

δ: grain boundary width (μm).

2. The austenitic stainless steel pipe having steam oxidation resistance according to claim 1, wherein a crystal grain size of the steel pipe is 50 μm or smaller.

3. A manufacturing method for an austenitic stainless steel pipe having steam oxidation resistance containing, by mass percent, 14 to 28% of Cr and 6 to 30% of Ni, wherein a region satisfying Formula (1) is formed in a metal structure at least in one location of 10 to 15 μm in a depth range from an inner surface of the steel pipe, the method being carried out by blasting shots or sands onto the inner surface of the austenitic stainless steel pipe with an injection amount of 3 kg/cm²/min or larger;

$$g \geq 0.3 \tag{1}$$

where g in Formula (1) is a value calculated from Formula (2), $$g = (\alpha/\beta) \times \delta/\epsilon \times 100 \tag{2}$$

where the meanings of symbols in Formula (2) are as follows;

g: volume ratio (%)

α: sum total of the number of pixels of digital image in region in which orientation difference of adjacent crystals detected by electron backscattering pattern is 5 to 50 degrees β: the number of total pixels of digital image in region of measurement using electron backscattering pattern ε: analysis pitch width of electron backscattering pattern (μm)

δ: grain boundary width (μm).

4. The manufacturing method for an austenitic stainless steel pipe having steam oxidation resistance according to claim 3, wherein the method is carried out by blasting shots or sands having an average particle size of 0.5 mm or smaller.

* * * * *